(12) United States Patent
Jang et al.

(10) Patent No.: US 9,389,455 B2
(45) Date of Patent: Jul. 12, 2016

(54) PRESSURE-SENSITIVE ADHESIVE COMPOSITION

(75) Inventors: Ki Seok Jang, Daejeon (KR); Suk Ky Chang, Daejeon (KR); Min Soo Park, Daejeon (KR); Se Woo Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/512,289

(22) PCT Filed: Nov. 26, 2010

(86) PCT No.: PCT/KR2010/008447
§ 371 (c)(1),
(2), (4) Date: May 25, 2012

(87) PCT Pub. No.: WO2011/065779
PCT Pub. Date: Jun. 3, 2011

(65) Prior Publication Data
US 2012/0274881 A1    Nov. 1, 2012

(30) Foreign Application Priority Data

Nov. 27, 2009 (KR) .................. 10-2009-0115697

(51) Int. Cl.
*C09J 133/08* (2006.01)
*G02F 1/1335* (2006.01)
*C09J 133/02* (2006.01)

(52) U.S. Cl.
CPC ......... *G02F 1/133528* (2013.01); *C09J 133/02* (2013.01); *C09J 133/08* (2013.01); *C08L 2312/00* (2013.01); *G02F 2202/28* (2013.01); *Y10T 428/1068* (2015.01); *Y10T 428/1073* (2015.01); *Y10T 428/1077* (2015.01)

(58) Field of Classification Search
CPC ... C08L 2312/00; C09J 133/02; C09J 133/08; G02F 1/133528; G02F 2202/28; Y10T 428/1041; Y10T 428/1059; Y10T 428/1077
USPC ............ 428/1.31, 1.5, 1.54, 355 RA; 349/96, 349/122
See application file for complete search history.

(56) References Cited

U.S. PATENT DOCUMENTS

| 6,020,408 | A * | 2/2000 | Suzuki et al. ............. 524/265 |
| 2004/0182512 | A1* | 9/2004 | Matsumoto ............. 156/326 |
| 2004/0260009 | A1* | 12/2004 | Tosaki et al. ............. 524/529 |
| 2006/0162857 | A1 | 7/2006 | Nagamoto et al. |
| 2006/0173124 | A1* | 8/2006 | Paul ............. C08F 293/005 524/558 |
| 2007/0055006 | A1* | 3/2007 | Kim et al. ............. 524/556 |
| 2007/0117918 | A1* | 5/2007 | Kim et al. ............. 524/556 |
| 2007/0149715 | A1* | 6/2007 | Lee et al. ............. 525/329.5 |
| 2009/0234072 | A1* | 9/2009 | Nakagawa et al. ........... 525/100 |
| 2010/0129569 | A1* | 5/2010 | Park et al. ............. 428/1.55 |
| 2010/0209631 | A1* | 8/2010 | Kim et al. ............. 428/1.54 |
| 2010/0297368 | A1* | 11/2010 | Park et al. ............. 428/1.55 |
| 2011/0007244 | A1* | 1/2011 | Kim et al. ............. 349/96 |
| 2011/0043737 | A1* | 2/2011 | Kim et al. ............. 349/122 |
| 2011/0205469 | A1* | 8/2011 | Ha et al. ............. 349/96 |

FOREIGN PATENT DOCUMENTS

| CN | 1862330 A | 11/2006 | |
| EP | EP 0191534 A1 * | 8/1986 | ............. H01L 21/68 |
| JP | 11293201 | 10/1999 | |
| JP | 2000044894 | 2/2000 | |
| JP | 2002129123 | 5/2002 | |
| JP | 2006111651 | 4/2006 | |
| JP | 2008-031214 | 2/2008 | |
| JP | 2009035618 | 2/2009 | |
| JP | 2009519372 A | 5/2009 | |
| JP | 2009132909 | 6/2009 | |
| JP | 2009144145 | 7/2009 | |
| JP | 2011511100 A | 4/2011 | |
| KR | 10-2005-0088241 A | 9/2005 | |
| KR | 10-2007-0094066 A | 9/2007 | |
| KR | 10-2009-0077648 A | 7/2009 | |
| KR | 10-2009-0077652 A | 7/2009 | |
| KR | 10-2009-0077664 A | 7/2009 | |
| TW | 200902660 A | 1/2009 | |
| WO | WO 2007069856 A1 * | 6/2007 | |
| WO | WO 2008091050 A1 * | 7/2008 | ............. C09J 133/06 |
| WO | 2009060909 A1 | 5/2009 | |
| WO | 2009/088205 | 7/2009 | |

OTHER PUBLICATIONS

Abstract, WO/2009/0088205 of PCT/KR2009/000049, Kim4 et al., Jul. 16, 2009.*
Abstract, WO/2009/091162 of PCT/KR2009/000152, Kim et al., Jul. 23, 2009.*

* cited by examiner

*Primary Examiner* — Sophie Hon
(74) *Attorney, Agent, or Firm* — Dentons US LLP

(57) ABSTRACT

The present invention relates to a pressure sensitive adhesive composition, a polarizer and a liquid crystal display device. The present invention may provide a pressure sensitive adhesive which can have excellent stress relaxation characteristic to effectively inhibit light leakage by dimension change of optical films such as polarizing plates. In addition, a pressure sensitive adhesive having excellent physical properties such as adhesion durability and workability may be provided.

8 Claims, No Drawings

PRESSURE-SENSITIVE ADHESIVE COMPOSITION

This application is a National Stage Entry of International Application No. PCT/KR2010/008447, filed Nov. 26, 2010, and claims the benefit of Korean Application Nos. 10-2009-0115697, filed on Nov. 27, 2009, and 10-2009-0115695, filed on Nov. 27, 2009, which are hereby incorporated by reference for all purposes as if fully set forth herein.

TECHNICAL FIELD

The present invention relates to a pressure sensitive adhesive composition.

BACKGROUND ART

A polarizing plate is an optical member included in a liquid crystal display (LCD). The polarizing plate may have a multilayer structure of a polarizing element comprising an iodine compound or a dichroic polarizing material, which is arranged in a given direction, and a protective film to protect the element and to be formed on one or both sides thereof. In addition, the polarizing plate may further comprise an additional functional film such as a retardation plate, a wide view angle compensation plate or a brightness enhancing film.

Each film consisting of a multilayer polarizing plate is made of materials having molecular structures and compositions different from each other. Therefore, each film in the polarizing plate represents physical properties different from each other. Especially, there is a problem that dimensional stability is lowered depending on difference of shrinkage or expansion behavior by each material in the polarizing plate under a severe condition such as high temperature or high humidity condition.

For example, when the polarizing plate is fixed by a pressure sensitive adhesive, stress is focused on the protective film, and the like, by the above difference of behavior under the severe condition to cause birefringence and a light leakage phenomenon called as a light beaming phenomenon.

As a method for solving such problems, a technique to provide the pressure sensitive adhesive with stress relaxation characteristic has been known. Specifically, a method of designing the pressure sensitive adhesive to have high creep against an external stress and to be easily modified has been known (ex. Korean Unexamined Patent Publication No. 1998-079266, Japanese Unexamined Patent Publication No. 2002-047468).

However, in the above technique, the pressure sensitive adhesive has very low tailoring property and workability. If the tailoring property and workability are lowered as such, there are problems that on mass-producing optical films such as polarizing plates, defects, such as extrusion or pressing of the pressure sensitive adhesive, are caused, so that yield decreases highly.

Furthermore, there is an attempt to minimize light leakage by designing the pressure sensitive adhesive very hard.

For example, in Japanese Unexamined Patent Publication Nos. 2007-197659 and 2007-212995, a technique of preparing a pressure sensitive adhesive is disclosed, which is prepared by adding a multifunctional acrylate, an isocyanate hardener and a photoinitiator to an acrylic polymer containing a carboxyl group, followed by UV irradiation. In Japanese Unexamined Patent Publication No. 2007-212995, a technique of preparing a pressure sensitive adhesive is disclosed, which is prepared by combining a copolymer containing a hydroxyl group and a copolymer containing a carboxyl group in a given ratio, and adding a multifunctional acrylate, a multifunctional isocyanate hardener and a photoinitiator thereto, followed by UV irradiation.

However, said pressure sensitive adhesives have very low initial adhesive strength depending on storage modulus (G'), so that durability under high temperature or high humidity is lowered, or much light leakage is caused.

DISCLOSURE

Technical Problem

The present invention is intended to provide with a pressure sensitive adhesive composition.

Technical Solution

The present invention relates to a pressure sensitive adhesive composition comprising a crosslinkable acrylic polymer having a weight average molecular weight of more than 500,000 and less than 1,000,000; and a multifunctional crosslinker, wherein an interpenetrating polymer network (hereinafter, sometimes called as "IPN") structure is embodied in a cured state.

In one aspect, the present pressure sensitive adhesive composition may be used as a pressure sensitive adhesive composition for polarizing plates and specifically, for attaching the polarizing plate to a liquid crystal panel.

The pressure sensitive adhesive composition of the present invention is explained in detail below.

The present pressure sensitive adhesive composition comprises a crosslinkable acrylic polymer having a weight average molecular weight of 500,000 and 1,000,000. The weight average molecular weight herein means a converted value to polystyrene as measured by a gel permeation chromatography (GPC). Also, the molecular weight means a weight average molecular weight unless it is mentioned specifically otherwise herein.

The term "crosslinkable acrylic polymer" herein means an acrylic polymer comprising a functional group which may be reacted with a multifunctional crosslinker. Also, the term "multifunctional crosslinker" means a compound having at least two functional groups which may be reacted with the crosslinkable functional group included in said acrylic polymer to embody a crosslinked structure.

A molecular weight of the crosslinkable acrylic polymer herein exceeds 500,000, whereby the cohesive attraction and durability thereof may be excellently maintained, and the molecular weight is controlled to less than 1,000,000 for the pressure sensitive adhesive to represent excellent stress relaxation characteristic, so that the light leakage phenomenon may be effectively inhibited. The molecular weight of the crosslinkable acrylic polymer herein may be preferably, 600,000 to 900,000 and more preferably, 600,000 to 800,000.

As long as the crosslinkable acrylic polymer herein has the aforementioned range of the molecular weight and comprises a crosslinkable functional group, a specific composition thereof is not particularly limited. In one aspect, said polymer may be a polymer comprising 80 to 99.8 parts by weight of (meth)acrylic acid ester monomer; and 0.02 to 20 parts by weight of a crosslinkable monomer as a polymerized unit. The term "part by weight" means a ratio by weight.

A specific kind of (meth)acrylic acid ester monomer herein is not particularly limited, and for example, alkyl (meth) acrylate may be used. In view of controlling cohesive attraction, glass transition temperature and adhesion of the pressure sensitive adhesive, alkyl (meth)acrylate having an alkyl group with 1 to 14 carbon atoms may be used, without limiting thereto. An example of such a monomer may include methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, is ooctyl (meth)acrylate, isononyl (meth)acrylate, lauryl (meth)acrylate and tetradecyl (meth)acrylate, wherein one or two or more, in combination thereof, of the foregoing may be used. The present polymer may comprise (meth)acrylic acid ester monomer in an amount of 80 to 99.8 parts by weight based on weight of the crosslinkable functional group, whereby the initial bond strength, cohesive attraction and durability may be appropriately maintained.

The present polymer comprises a crosslinkable monomer in a polymerized form. The crosslinkable monomer is a monomer which may provide the acrylic polymer with a crosslinkable functional group that can be reacted with the multifunctional crosslinker.

An example of the crosslinkable monomer may include a monomer having a hydroxyl group, a carboxyl group, a nitrogen containing group such as a substituted or unsubstituted amide group, an isocyanate group or a glycidyl group, of which a monomer containing a hydroxyl group or a carboxyl group is preferably used, without limiting thereto. In a field of preparing pressure sensitive adhesives, various monomers, which can provide the polymer with each of said functional groups, are known. For example, an example of said monomer containing a hydroxyl group may include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate or 2-hydroxypropyleneglycol (meth)acrylate, and the like; an example of the monomer containing a carboxyl group includes (meth)acrylic acid, 2-(meth)acryloyloxy acetic acid, 3-(meth)acrylolyloxy propanoic acid, 4-(meth)acryloyloxy butanoic acid, acrylic acid dimer, itaconic acid, maleic acid and maleic anhydride, and the like. Here, one or two or more, in combination thereof, of the foregoing may be used.

In the present crosslinkable polymer, the crosslinkable monomer may be included in an amount of 0.02 to 20 parts by weight based on weight of (meth)acrylic acid ester monomer. Therefore, endurance reliability, adhesion and/or peel force of the pressure sensitive adhesive may be effectively maintained.

The crosslinkable acrylic polymer herein may further comprise a monomer represented by the following chemical formula 1 as a polymerized unit, if desired. The monomer of chemical formula 1 may be added for the purpose of controlling glass transition temperature or providing other functionality.

[Chemical Formula 1]

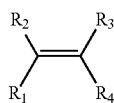

wherein, $R_1$ to $R_3$ represent each independently hydrogen or alkyl, $R_4$ represents cyano; phenyl unsubstituted or substituted with alkyl; acetyloxy; or $COR_5$, where $R_5$ represents amino or glycidyloxy unsubstituted or substituted with alkyl or alkoxyalkyl.

In definitions of $R_1$ to $R_5$ of the above formula, alkyl or alkoxy means alkyl or alkoxy having 1 to 8 carbon atoms, and is preferably methyl, ethyl, methoxy, ethoxy, propoxy or butoxy.

The specific example of said monomer of chemical formula 1 may include one or two or more of a nitrogen containing monomer such as (meth)acrylonitrile, (meth)acrylamide, N-methyl (meth)acrylamide or N-butoxy methyl (meth)acrylamide; a styrene monomer such as styrene or methyl styrene; glycidyl (meth)acrylate; or a carbonic acid vinyl ester such as vinyl acetate, and the like, but is not limited thereto. When the present polymer comprises said monomer of chemical formula 1, the content may be 20 parts by weight, based on weight of (meth)acrylic acid ester monomer.

A method of preparing said crosslinkable acrylic polymer herein is not particularly limited. For example, the polymer may be prepared by applying a monomeric mixture comprising the desired monomers to a polymerization method such as solution polymerization, photo polymerization, bulk polymerization, suspension polymerization or emulsion polymerization. Preferably, the solution polymerization herein is used, but is not limited thereto.

The present pressure sensitive adhesive composition comprises a multifunctional crosslinker that may be reacted with a crosslinkable acrylic polymer to embody a crosslinked structure.

The usable specific crosslinker herein is not particularly limited to any kind and may be appropriately selected from general crosslinkers, such as an isocyanate compound, an epoxy compound, an aziridine compound and a metal chelate compound, considering a kind of the crosslinkable functional group to be included in the polymer. A specific example of said isocyante compound may include tolylene diisocyante, xylene diisocyante, diphenylmethane diisocyante, hexamethylene diisocyante, isophorone diisocyante, tetramethylxylene diisocyante or naphthalene diisocyante, and the like, or a compound obtained by reacting a polyol compound such as trimethylol propane with said isocyanate compound may be used. A specific example of the epoxy compound may include one or more selected from the group consisting of ethyleneglycol diglycidyl ether, triglycidyl ether, trimethylolpropane triglycidyl ether, N,N,N',N'-tetraglycidyl ethylenediamine and glycerine diglycidyl ether; and a specific example of the aziridine compound may include one or more selected from the group consisting of N,N'-toluene-2,4-bis(1-aziridinecarboxamide), N,N'-diphenylmethane-4,4'-bis(1-aziridinecarboxamide), triethylene melamine, bisisophthaloyl-1-(2-methylaziridine) and tri-1-aziridinylphosphine oxide, but is not limited thereto. In addition, a specific example of said metal chelate compound may include a compound that a multivalent metal such as aluminum, iron, zinc, tin, titanium, antimony, magnesium and/or vanadium is coordinated with acetyl acetone or ethyl acetoacetate, and the like, but is not limited thereto.

In the composition of the present invention, said crosslinker may be included in an amount of 0.01 to 10 parts by weight, and preferably 0.01 to 5 parts by weight, relative to 100 parts by weight of a crosslinkable acrylic polymer. The cohesive attraction of the pressure sensitive adhesive may be maintained by containing the crosslinker in an amount of at least 0.01 parts by weight, and the endurance reliability may be outstandingly maintained by containing it in an amount of up to 10 parts by weight.

The present pressure sensitive adhesive composition may further comprise a non-crosslinkable acrylic polymer, specifically, a non-crosslinkable acrylic polymer having a molecular weight of more than 500,000 and less than 1,000, 000. The term "non-crosslinkable acrylic polymer" means an acrylic polymer that contains no intermolecular functional group which may be reacted with a multifunctional crosslinker. The non-crosslinkable polymer may act on regulating a gel fraction of a crosslinkable polymer to form a gel by the multifunctional crosslinker, plasticizing a pressure sensitive adhesive by being penetrated into or connected to the crosslinked network (IPN) of the pressure sensitive adhesive and increasing elasticity and flexibility of the adhesive at the same time, and inhibiting a light leakage phenomenon.

Said non-crosslinkable acrylic polymer herein may have a molecular weight of more than 500,000 and less than 1,000,000, preferably 600,000 to 900,000, and more preferably 600,000 to 800,000. By controlling the molecular weight of the non-crosslinkable acrylic polymer in the above range, the pressure sensitive adhesive may have excellent cohesive attraction, endurance reliability and stress relaxation characteristic at the same time.

Furthermore, as long as the non-crosslinkable acrylic polymer herein has the aforementioned weight average molecular weight, its specific composition is not particularly limited.

For example, said non-crosslinkable acrylic polymer may be a polymer that (meth)acrylic acid ester monomer is included as a polymerized unit. The usable (meth)acrylic acid ester monomer is not particularly limited to any kind, and the same monomers as described in the aforementioned crosslinkable acrylic polymer may be used. In addition, the monomeric mixture forming said non-crosslinkable acrylic polymer may comprise an additional monomeric component of said monomer of chemical formula 1, as long as it contains no crosslinkable monomer.

When a non-crosslinkable polymer is included in the present pressure sensitive adhesive composition, a ratio of the non-crosslinkable acrylic polymer to the crosslinkable acrylic polymer (non-crosslinkable acrylic polymer/crosslinkable acrylic polymer) by weight may be, for example, 0 to 1, preferably 0.0001 to 1, more preferably 0.01 to 0.5, and most preferably 0.1 to 0.4. By controlling the ratio as such, endurance reliability under a severe condition may be outstandingly maintained.

The present pressure sensitive adhesive composition may further comprise a multifunctional acrylate. Said multifunctional acrylate may be polymerized on curing to embody a crosslinked structure.

The multifunctional acrylate is not particularly limited to any kind. For example, it may include a difunctional acrylate such as 1,4-butanediol di(meth)acrylate, 1,6-hexanediol di(meth)acrylate, neopentylglycol di(meth)acrylate, polyethyleneglycoldi(meth)acrylate, neopentylglycol adipate di(meth)acrylate, hydroxypivalic acid neopentylglycol di(meth)acrylate, dicyclopentanyl di(meth)acrylate, caprolactone modified dicyclopentenyl di(meth)acrylate, ethyleneoxide modified di(meth)acrylate, di(meth)acryloxy ethyl isocyanulate, allylated cyclohexyl di(meth)acrylate, tricyclodecanedimethanol (meth)acrylate, dimethylol dicyclopentane di(meth)acrylate, ethyleneoxide modified hexahydrophthalic acid di(meth)acrylate, tricycloecane dimethanol (meth)acrylate, neopentylglycol modified trimethylpropane di(meth)acrylate, adamantane di(meth)acrylate or 9,9-bis[4-(2-acryloyloxyethoxy)phenyl]fluorene; a trifunctional acrylate such as trimethylolpropane tri(meth)acrylate, dipentaerythritol tri(meth)acrylate, propionic acid modified dipentaerythritol tri(meth)acrylate, pentaerythritol tri(meth) acrylate, propyleneoxide modified trimethylolpropane tri (meth)acrylate, 3-functional urethane (meth)acrylate or tris (meth)acryloxy ethylisocyanulate; a tetrafunctional acrylate such as diglycerine tetra (meth)acrylate or pentaerythritol tetra(meth)acrylate; a pentafunctional acrylate such as propionic acid modified dipentaerythritol penta(meth)acrylate; and a hexafunctional acrylate such as dipentaerythritol hexa (meth)acrylate, caprolactone modified dipentaerythritol hexa (meth)acrylate or urethane (meth)acrylate (ex. a reactant of an isocyanate monomer and tri methylolpropane tri(meth) acrylate), but is not limited thereto.

Here, one or two or more of the above multifunctional acrylates may be used alone or in combination therewith. Especially, in view of realizing the more outstanding durability, it is preferred to use at least 3-functional acrylates having a molecular weight of less than 1,000, but is not limited thereto.

Especially, it is preferred to use an acrylate comprising a cyclic structure in a molecular structure as a multifunctional acrylate. Here, the cyclic structure is any structure of a carbocyclic structure or a heterocyclic structure; or a monocyclic or polycyclic structure. In particular, an example of the cyclic structure included in said multifunctional acrylate may include a cycloalkyl cyclic structure having 3 to 12 carbon atoms, preferably 3 to 8 carbon atoms, such as cyclopentane, cyclohexane or cycloheptane, wherein at least 1, preferably 1 to 5, and more preferably 1 to 3 of said cyclic structure may be included in the acrylate, and at least one heteroatom such as O, S or N may be also included therein.

A specific example of a multifunctional acrylate comprising a cyclic structure as above to be capable of being used herein may include a monomer having an isocyanulate structure such as tris(meth)acryloxy ethyl isocyanulate, an isocyanulate modified urethane acrylate (ex. a reactant of an isocyanate compound having a cyclic structure in the molecule, for example, isophorone disocyante, and an acrylate compound, for example, trimethylolpropane tri(meth)acrylate or pentaerythritol tri(meth)acrylate, and the like), and the like, but is not limited thereto.

In the present pressure sensitive adhesive composition, the multifunctional acrylate may be included in an amount of more than 5 parts by weight and less than 15 parts by weight, relative to 100 parts by weight of the aforementioned crosslinkable acrylic polymer. By controlling the ratio of the multifunctional acrylate by weight as such, the suitably crosslinked structure may be embodied and endurance reliability may be also excellently maintained.

The present pressure sensitive adhesive composition embodies the IPN structure in a cured state. The term "a cured state of a pressure sensitive adhesive composition" means a state that the composition is changed into a form of the pressure sensitive adhesive via photo-irradiation, heating and/or aging processes, and the like. The term "photo-irradiation" means electromagnetic wave irradiation that may affect a photocurable, photocrosslinkable or photopolymerizable compound such as a multifunctional acrylate and cause a hardening, crosslinking or polymerizing reaction. Electromagnetic waves include particle beams such as α-particle beams, proton beams, neutron beams and electron beams as well as microwaves, infrared (IR), ultraviolet (UV), X-ray and γ-ray.

The term "IPN structure" means a state that at least two crosslinked structures are present in the pressure sensitive adhesive. In one aspect, the IPN structure may also mean a structure comprising at least two crosslinked structures present in a state that each other is intertwined, entangled or penetrated. For example, when the present composition comprises the multifunctional acrylate, said IPN structure may comprise a crosslinked structure by a reaction of said crosslinkable acrylic polymer and a multifunctional crosslinker, that is, a crosslinked structure by a crosslinkable acrylic polymer crosslinked with a multifunctional crosslinker (hereinafter, optionally referred to a first crosslinked structure) and a crosslinked structure by the polymerized multifunctional acrylate (hereinafter, optionally referred to a second crosslinked structure), wherein such first and second crosslinked structures may be present in a state that each other is penetrated or entangled. The pressure sensitive adhesive comprises the IPN structure, whereby acrylic polymers having low molecular weight are used but the pressure sensitive adhesive without the lowered endurance reliability and with excellent adhesion property, re-detachability and workability, and the like may be embodied.

The present pressure sensitive adhesive composition may further comprise a photoinitiator. Said photoinitiator may carry out a polymerization reaction of the multifunctional acrylate with photo irradiation to provide inside of the pressure sensitive adhesive with a crosslinked structure.

The usable photoinitiator herein is not particularly limited to any kind, as long as it may generate a radical with photo irradiation to initiate a polymerization reaction of a multifunctional acrylate. A specific example of the usable photoinitiator herein may include benzoins, hydroxyl ketones, aminoketones or phosphine oxides, and the like, and more particularly, benzoin, benzoin methyl ether, benzoin ethyl ether, benzoin isopropyl ether, benzoin n-butyl ether, benzoin isobutyl ether, acetophenone, dimethylamino acetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexylphenylketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone] and 2,4,6-trimethylbenzoyl-diphenyl-phosphineoxide, and the like, but is not limited thereto. Here, one or two or more of the foregoing may be used.

The photoinitiator herein may be included in an amount of 0.01 to 10 parts by weight, preferably 0.01 to 5 parts by weight, relative to 100 parts by weight of a crosslinkable acrylic polymer, or of 0.2 to 20 parts by weight, relative to 100 parts by weight of a multifunctional acrylate. If the content of the photoinitiator is too low, it is apprehended that the polymerization or curing reaction will not be smoothly carried out. If the content is too high, it is apprehended that physical properties such as endurance reliability or transparency will be lowered.

The present pressure sensitive adhesive composition may further comprise a silane coupling agent. Such a coupling agent may enhance adhesion and bond stability between a pressure sensitive adhesive and a glass substrate to improve heat resistance and humidity resistance. In addition, said coupling agent may act on improving bond reliability, when the pressure sensitive adhesive has been left in high temperature or high humidity condition for a long time. An example of the usable coupling agent herein may include γ-glycidoxypropyl triethoxy silane, γ-glycidoxypropyl trimethoxy silane, γ-glycidoxypropyl methyldiethoxy silane, γ-glycidoxypropyl triethoxy silane, 3-nercaptopropyl trimethoxy silane, vinyltrimethoxysilane, vinyltriethoxy silane, γ-methacryloxypropyl trimethoxy silane, γ-methacryloxy propyl triethoxy silane, γ-aminopropyl trimethoxy silane, γ-aminopropyl triethoxy silane, 3-isocyanato propyl triethoxy silane, γ-acetoacetatepropyl trimethoxysilane, γ-acetoacetatepropyl triethoxy silane, β-cyanoacetyl trimethoxy silane, β-cyanoacetyl triethoxy silane, acetoxyacetotrimethoxy silane, and one or two or more, in combination therewith, of the foregoing may be used. Here, it is preferred to use a silane coupling agent having an acetoacetate group or a β-cyanoacetyl group, but is not limited thereto. In the present composition, the silane coupling agent may be included in an amount of 0.01 to 5 parts by weight, preferably 0.01 to 1 part by weight, relative to 100 parts by weight of an acrylic resin. If the content of the coupling agent is less than 0.01 parts by weight, it is apprehended that the increased effect of adhesion strength will be slight. If it is more than 5 parts by weight, endurance reliability will be lowered.

In view of controlling adhesion performance, the present pressure sensitive adhesive composition may further comprise a tackifier. Such a tackifier is not particularly limited to any kind and, for example, one or two or more of a hydrocarbon resin or hydrogenated products thereof, a rosin resin or hydrogenated products thereof, a rosin ester resin or hydrogenated products thereof, a terpene resin or hydrogenated products thereof, a terpene phenol resin or hydrogenated products thereof, a polymerized rosin resin or a polymerized rosin ester resin may be used alone or as a mixture. The tackifier may be included in an amount of 1 to 100 parts by weight, relative to 100 parts by weight of a crosslinkable acrylic polymer. If said amount is less than 1 part by weight, it is apprehended that an effect of addition will be slight. If it is more than 100 parts by weight, the increased effect of compatibility and/or cohesive attraction will be lowered.

The present pressure sensitive adhesive composition may further comprise at least one additive selected from the group consisting of an epoxy resin, a crosslinker, a ultraviolet light stabilizer, an antioxidant, a toning agent, a reinforcing agent, a filler, a defoamer, a surfactant and a plasticizer in a range which does not affect the effect of the invention.

By setting the polymer to have a low molecular weight, the present invention has a benefit that the coating process can be effectively carried out even in a state of setting the coating liquid to have high solid content. Therefore, productivity of optical elements may be maximized.

That is, the molecular weight of the polymer is related to various physical properties such as durability or coating property of the pressure sensitive adhesive. For example, when the polymer has too low molecular weight, cohesive attraction of the pressure sensitive adhesive is lowered, whereby endurance reliability is lowered; for example, bubbles or a peel-off phenomenon occurs under high temperature or high humidity condition. On the contrary, when the polymer has too high molecular weight, durability of the pressure sensitive adhesive may be improved. However, there is a problem that viscosity of the coating liquid for preparing the pressure sensitive adhesive increases highly. Accordingly, in view of securing durability, the polymer is set in a high range to have a molecular weight of, usually, at least 1,200,000, generally, at least 1,500,000, but considering viscosity of the pressure sensitive adhesive composition (coating liquid), the solid content is set in a low range of about 12 to 15% by weight. In the existing process, the molecular weight of resin is set high to secure durability of the pressure sensitive adhesive. As a result, there are problems that the solid content of the coating liquid is necessarily lowered, the production efficiency is deteriorated, and it is difficult to uniformly control thickness.

In the present invention, the coating process is capable of effectively proceeding even in a state of high solid content that the pressure sensitive adhesive composition has a solid content of at least 20% by weight, preferably at least 25% by weight. Said solid content means a solid content at a time when the present pressure sensitive adhesive composition is prepared in a form of a coating liquid, and the like and applied to a process for preparing the pressure sensitive adhesive. If the present pressure sensitive adhesive composition has a solid content of less than 20% by weight, it is apprehended that effects for improving productivity and efficiency in the process for preparing the pressure sensitive adhesive or a polarizing plate will be lowered. In addition, the upper limit on said solid content herein is not particularly limited and may be appropriately selected considering viscosity of the composition. For example, said solid content herein can be suitably controlled in a range of at least 50% by weight, preferably at least 40% by weight, and more preferably 30% by weight. Furthermore, the viscosity of the composition at room temperature may be in a range of 3,000 to 12,000 cP, preferably 3,500 to 10,000 cP. Here, the room temperature means usually a temperature of about 15 to 35° C. as a temperature in a natural state without heating or cooling.

The present invention relates to a polarizing plate comprising a polarizing element; and a pressure sensitive adhesive composition as mentioned above in a cured state which is formed on one or both sides of said polarizing element, and having a pressure sensitive adhesive layer for attaching the polarizing plate to a liquid crystal panel.

The polarizing plate to be used herein is not particularly limited to any kind and general species known in this field may be adapted. For example, said polarizing plate may comprise a polarizing element; and a protective film formed on one or both sides of said polarizing element, wherein said pressure sensitive adhesive layer may be formed on one side of said protective film.

The polarizing element included in the present polarizing plate is not particularly limited to any kind, and for example, general species known in this field such as a polyvinylalcohol polarizing element may be adapted without limitation.

The polarizing element is a functional film or sheet that may extract only light vibrating in one direction from incident light vibrating in several directions. Such a polarizing element may be in a form that dichroic colors are adsorbed and aligned to a polyvinylalcohol resin film. For example, a polyvinylacetate resin may gelate to obtain the polyvinylalcohol resin constituting the polarizing element. The usable polyvinylacetate resin may include a copolymer of vinyl acetate and other polymerizable monomers with vinyl acetate as well as a homopolymer of vinyl acetate. Here, an example of polymerizable monomers with vinyl acetate one or two or more, in combination therewith, of unsaturated carbonic acids, olefins, vinylethers, unsaturated sulfonic acids and acrylamides with an ammonium group, but is not limited thereto. A degree of gelation of the polyvinylalcohol resin may be usually 85 to 100 mol %, preferably at least 98 mol %. Said polyvinylalcohol resin may be also additionally modified, and for example, polyvinylformal and polyvinylacetal modified with aldehydes may be also used. In addition, a polymerization degree of the polyvinylalcohol resin may be usually 1,000 to 10,000, preferably 1,500 to 5,000.

The polvinylalcohol resin as above may form a film to use as a disk film of the polarizing element. A method of forming a film from the polyvinylalcohol resin is not particularly limited and general methods known in this field may be used. A thickness of the disk film formed by the polyvinylalcohol resin is not particularly limited, which may be appropriately controlled in a range of, for example, 1 to 150 µm. Said thickness of the disk film may be controlled in at least 10 µm considering easiness of extension.

The polarizing element may be prepared via processes of stretching the polyvinaylalcohol resin film as above (ex. uniaxially stretching), dyeing the polyvinylalcohol resin film with dichroic colors and adsorbing them thereto, treating the polyvinylalcohol resin film that the dichroic colors are adsorbed with boric acid aqueous solution and washing it after treating with boric acid aqueous solution. As the dichroic colors, iodine or dichroic organic dyes, and the like may be used.

In addition, the present polarizing plate may further comprise a protective film formed on one or both sides of said polarizing element. The protective film which can be included in the present polarizing plate is not particularly limited to any kind, and may be formed as a multi-layered film laminated with the protective film consisting of, for example, cellulose films such as triacetyl cellulose; polyester films such as polycarbonate films or polyethyleneterephthalate films; polyethersulfone films; and/or polyolefin films such as polyethylene films, polypropylene films, or polyolefin films having a cyclo or norbornene structure or polyolefin films such as ethylene propylene copolymer, and the like. Here, a thickness of said protective film is not particularly limited and it may be formed to have a usual thickness.

A method of forming the pressure sensitive adhesive layer on the polarizing plate is not particularly limited, and for example, a method of applying the pressure sensitive adhesive composition (coating liquid) by a usual means such as the above bar coater and curing it, or a method of first applying the pressure sensitive adhesive composition to a surface of a releasable substrate and curing it, and then transferring the formed pressure sensitive adhesive layer to the polarizing plate, and the like, may be used.

It is preferred that the process for forming the pressure sensitive adhesive layer is carried out after sufficiently removing bubble causing components such as volatile components or reacting residues inside of the pressure sensitive adhesive composition (coating liquid). Therefore, problems, such as a pressure sensitive adhesive has so low crosslink density or molecular weight that modulus of elasticity is lowered, and bubbles present between a glass plate and a pressure sensitive adhesive layer at the elevated temperature have so large size that scattering bodies are formed inside, can be inhibited.

In addition, a method of curing the present pressure sensitive adhesive composition on preparing the polarizing plate is not particularly limited, and, for example, suitable electromagnetic wave irradiation for inducing polymerization, crosslinkage or curing reactions of photopolymerizable, photocrosslinking or photocurable components in the composition, such as ultraviolet irradiation in combination with suitable heating or even aging processes to be capable of inducing a reaction of a crosslinkable polymer and a multifunctional crosslinker, may be carried out.

In case of applying the ultraviolet irradiation method herein, said ultraviolet irradiation may be carried out using means such as a high pressure mercury lamp, an electrodeless lamp or a xenon lamp. Also, in the ultraviolet curing method, the irradiance level is not particularly limited, as long as it is controlled to a degree that sufficient curing is obtained without damaging all physical properties. For example, preferably, illuminance is 50 to 1,000 mW/cm$^2$ and light quantity is 50 to 1,000 mJ/cm$^2$.

The pressure sensitive adhesive layer prepared via the above procedures has a gel content, as represented by the following general formula 2, of preferably at least 80% by weight and more preferably at least 90% by weight.

$$\text{Gel content (\% by weight)} = B/A \times 100 \qquad \text{[General Formula 2]}$$

wherein, A represents a mass of said pressure sensitive adhesive, B represents a dry mass of insoluble fractions in said pressure sensitive adhesive after depositing it in ethyl acetate at room temperature for 48 hours.

If said gel content is less than 80% by weight, it is apprehended that endurance reliability of the pressure sensitive adhesive under high temperature and/or high humidity condition will be lowered.

The upper limit of said gel content herein is not particularly limited, and may be appropriately controlled, for example, in a range of up to 99% considering stress relaxation characteristic of the pressure sensitive adhesive, and the like.

The present polarizing plate may further comprise at least one functional layer selected from the group consisting of a protective layer, a reflective layer, an antiglare layer, a retardation plate, a wide view angle compensation film and a brightness enhancing film.

The present invention also relates to a liquid crystal display device comprising a liquid crystal panel that the polarizing plate according to the present invention as mentioned above is attached to one or both sides.

Said liquid crystal panel included in the liquid crystal display device of the present invention is not particularly limited to any kind. Various passive matrix types including TN (Twisted Nematic) type, STN (Super Twisted Nematic) type, F (ferroelectric) type and PD (polymer dispersed LCD) type, and the like; various active matrix types including two terminal type and three terminal type; the known liquid crystal panels including In-plane switching (IPS) mode panels and vertical alignment (VA) mode panels may be applied without limiting to any kind. In addition, other components included in the liquid crystal display of the present invention are not particularly limited to any kind, the method of preparing the same are also not particularly limited. General components in this field may be selected and used without limitation.

Advantageous Effects

In the present invention, the weight average molecular weight of the crosslinkable acrylic polymer, which is reacted with a multifunctional crosslinker to embody a crosslinked structure, is set low to provide the pressure sensitive adhesive with excellent stress relaxation characteristic, whereby light leakage in accordance with the dimensional change of a polarizing plate may be effectively inhibited. Also, the pressure sensitive adhesive, which inhibits lowering of durability according to the low weight average molecular weight of the acrylic polymer and has excellent physical properties such as adhesion properties, re-detachability and workability, may be provided by embodying an interpenetrating polymer network therein.

DETAILED DESCRIPTION FOR CARRYING OUT THE INVENTION

The present invention is explained in more detail through examples according to the present invention and comparative examples not according to the present invention below, but the scope of the present invention is not restricted by the following examples.

Preparation Example 1

Preparation of Crosslinkable Acrylic Polymer (A)

In a 1 L reactor with nitrogen gas refluxed and installing a refrigerator to easily regulate a temperature, 98 parts by weight of n-butyl acrylate (n-BA) and 2 parts by weight of hydroxyethyl methacrylae (HEMA) were poured. Subsequently, 120 parts by weight of ethyl acetate (EAc) as a solvent was introduced thereto and nitrogen gas was purged for 60 minutes to remove oxygen. Then, 0.03 parts by weight of azobisisobutyronitrile (AIBN) was introduced thereto with maintaining the reactor at 60° C. and reacted for 8 hours to prepare a crosslinkable acrylic polymer (A) having a weight average molecular weigh of about 700,000. The weight average molecular weight herein was measured by general gel permeation chromatography (GPC) method.

Preparation Examples 2 to 8

Preparation of Crosslinkable and Non-Crosslinkable Acrylic Polymers

Crosslinkable and non-crosslinkable acrylic polymers were prepared by a method based on Preparation Example 1, except for monomer composition and weight average molecular weights of the prepared polymers to be regulated as the following tables 1 and 2.

TABLE 1

|  | Copolymer (A) | Copolymer (B) | Copolymer (C) | Copolymer (D) |
|---|---|---|---|---|
| Monomer Composition (part by weight) | n-BA/ HEMA (98/2) | n-BA(100) | n-BA/AA (97/3) | n-BA/HEMA (99/1) |
| $M_w$ (10,000) | 70 | 70 | 70 | 150 | n-BA: n-butyl acrylate
HEMA: 2-hydroxyethyl methacrylate
AA: acrylic acid
$M_w$: weight average molecular weight

TABLE 2

|  | Copolymer (A) | Copolymer (B) | Copolymer (C) | Copolymer (D) |
|---|---|---|---|---|
| Monomer Composition (part by weight) | n-BA (100) | n-BA/ HEMA (99/1) | n-BA (100) | n-BA/HEMA (98/2) |
| $M_w$ (10,000) | 150 | 120 | 120 | 40 | n-BA: n-butyl acrylate
HEMA: 2-hydroxyethyl methacrylate
AA: acrylic acid
$M_w$: weight average molecular weight Example 1

Preparation of Pressure Sensitive Adhesive Composition 12 parts by weight of tris(acryloxyethyl)isocyanulate (molecular weight: 423, trifunctional, aronix M-315), 1.59 parts by weight of 1-hydroxycyclohexyl phenyl ketone (Irg 184, manufactured by Ciba) as a photoinitiator and 0.01 parts by weight of trimethylol modified tolylene diisocyanate (coronate L) as a crosslinker were formulated, relative to 100 parts by weight of the crosslinkable acrylic polymer (A), to prepare a pressure sensitive adhesive composition.

Preparation of Pressure Sensitive Adhesive Polarizer

The above prepared pressure sensitive adhesive composition was coated on a PET film (manufactured by Mitsubishi, MRF-38) having a thickness of 38 μm and treated with a release sheet to have a thickness of 25 μm after drying, and dried in an oven at 110° C. for 3 minutes. Subsequently, the dried coating layer was stored in a constant temperature and humidity room (23° C., 55% RH) for about 24 hours, and then laminated on a wide view (WV) liquid crystal layer of the polarizing plate coated on one side therewith. Then, the laminated plate was subjected to ultraviolet irradiation under the following condition to prepare a pressure sensitive adhesive polarizing plate.

<Condition for Irradiating Ultraviolet>
Ultraviolet irradiator: high pressure mercury lamp
Irradiation condition: Illuminance=600 mW/cm², Light quantity=150 mJ/cm²

Examples 2 to 4 and Comparative Examples 1 to 6

The pressure sensitive adhesive polarizing plates were prepared by the method based on Example 1, except for composition of the pressure sensitive adhesive compositions to be changed as represented in the following tables 3 and 4.

For the pressure sensitive adhesive polarizing plates prepared in Examples and Comparative Examples, physical properties were measured by the following methods and their results were summarized in Tables 5 and 6 below.

1. Evaluation of Curl Property in Liquid Crystal Panel

The pressure sensitive adhesive polarizing plates prepared in Examples and Comparative Examples were each attached to both sides of general liquid crystal panels as top and bottom polarizing plates. Then, the liquid crystal panels, to which the polarizing plates were attached, were left in an oven at 80° C. for 72 hours, and removed from the oven to measure a degree of curling along four edges of the liquid crystal panels within 5 minutes and to evaluate curl property depending on the following standard.

<Evaluation Standard>
⊙: no occurrence of curl in liquid crystal panel
○: slight occurrence of curl in liquid crystal panel
Δ: some occurrence of curl in liquid crystal panel
x: frequent occurrence of curl in liquid crystal panel 2. Evaluation of Endurance Reliability The pressure sensitive adhesive polarizing plates prepared in Examples and Comparative Examples were tailored in a

TABLE 3

|  |  | Examples | | | |
|---|---|---|---|---|---|
|  |  | 1 | 2 | 3 | 4 |
| Crosslinkable copolymer | Kind | A | A | C | C |
|  | Part by weight | 100 | 100 | 100 | 100 |
| Non-crosslinkable polymer | Kind | — | B | — | B |
|  | Part by weight | — | 25 | — | 25 |
| Crosslinkable:Non-crosslinkable |  | 0 | 0.25 | 0 | 0.25 |
| MFA | Kind | M315 | M315 | M315 | M315 |
|  | Part by weight | 12 | 12 | 12 | 12 |
| Photoinitiator | Kind | Irg184 | Irg184 | Irg184 | Irg184 |
|  | Part by weight | 1.59 | 1.59 | 1.59 | 1.59 |
| Crosslinker | Kind | Coronate L | Coronate L | Coronate L | Coronate L |
|  | Part by weight | 0.01 | 0.07 | 0.04 | 0.07 |

M315: tris(acryloxyethyl)isocyanulate (Mw: 423, 3-functional
Irg184: 1-hydroxycyclohexyl phenyl ketone (Irg184, Ciba)
Crosslinker: trimethylol modified tolylene diisocyanate (coronate L)
Crosslinkable: Non-crosslinkable = Part by weight of Non-crosslinkable acrylic copolymer/Part by weight of Crosslinkable acrylic polymer

TABLE 4

|  |  | Comparative Examples | | | | | |
|---|---|---|---|---|---|---|---|
|  |  | 1 | 2 | 3 | 4 | 5 | 6 |
| Crosslinkable copolymer | Kind | D | D | F | F | A | H |
|  | Part by weight | 100 | 100 | 100 | 100 | 100 | 100 |
| Non-crosslinkable polymer | Kind | E | — | G | — | — | — |
|  | Part by weight | 400 | — | 400 | — | — | — |
| Crosslinkable:Non-crosslinkable |  | 4 | 0 | 4 | 0 | 0 | 0 |
| MFA | Kind | M315 | — | M315 | — | — | M315 |
|  | Part by weight | 12 | — | 12 | — | — | 12 |
| Photoinitiator | Kind | Irg184 | — | Irg184 | — | — | Irg184 |
|  | Part by weight | 1.59 | — | 1.59 | — | — | 1.59 |
| Crosslinker | Kind | Coronate L | Coronate L | Coronate L | Coronate L | Coronate L | Coronate L |
|  | Part by weight | 0.04 | — | 0.04 | 0.04 | 0.04 | 0.06 |

M315: tris(acryloxyethyl)isocyanulate (Mw: 423, 3-functional
Irg184: 1-hydroxycyclohexyl phenyl ketone (Irg184, Ciba)
Crosslinker: trimethylol modified tolylene diisocyanate (coronate L)
Crosslinkable:Non-crosslinkable = Part by weight of Non-crosslinkable acrylic copolymer/Part by weight of Crosslinkable acrylic polymer size of 90 mm×170 mm to prepare specimens, which were then attached to both sides of glass substrates (110 mm×190 mm×0.7 mm) in a state of crossed optical absorption axes to prepare samples. Here, the applied presser was about 5 Kg/cm², and the above procedures were carried out in a clean room to cause no bubbles or foreign materials. To identify humidity and heat resistance of the prepared samples, the samples were left at a temperature of 60° C. and under a 90% relative humidity condition for 1,000 hours and observed of whether bubbles or peel-off were present. In addition, for heat resistance, the samples were left at a temperature of 80° C. for 1,000 hours and then observed of whether bubbles or peel-off were present. The state of specimens was evaluated after being left at room temperature for 24 hours shortly before evaluation. Evaluation standards for reliability are as follows.

<Evaluation Standard>

○: no occurrence of bubbles or peel-off phenomenon

Δ: slight occurrence of bubbles or peel-off phenomenon x: frequent occurrence of bubbles or peel-off phenomenon 3. Evaluation of Light Transmission Uniformity (Light Leakage)

Light transmission uniformity was measured using the same specimens as those for evaluating endurance reliability. The above specimens were irradiated with backlight and observed of whether a portion of light leakage in a dark room was present. Specifically, the light transmission uniformity was evaluated by a method of attaching pressure sensitive adhesive polarizing plates (200 mm×200 mm) to both sides of glass substrates (210 mm×210 mm×0.7 mm) in a state crossed at 90 degrees and observing them. Evaluation standards for light transmission uniformity are as follows.

<Evaluation Standard>

○: it is difficult to identify a non-uniformity phenomenon in light transmission by the naked eye Δ: slight presence of a non-uniformity phenomenon in light transmission x: large presence of a non-uniformity phenomenon in light transmission Each physical property measured in the above was summarized in the following tables 5 and 6.

TABLE 5

|  |  | Examples | | | |
| --- | --- | --- | --- | --- | --- |
|  |  | 1 | 2 | 3 | 4 |
| Re-detachability |  | ○ | ⊙ | ○ | ⊙ |
| Endurance Reliability | Heat resistant condition | ○ | ○ | ○ | ○ |
|  | Humidity and heat resistant condition | ○ | ○ | ○ | ○ |
| Light transmission uniformity |  | ○ | ○ | ○ | ○ |

TABLE 6

|  |  | Comparative Examples | | | | | |
| --- | --- | --- | --- | --- | --- | --- | --- |
|  |  | 1 | 2 | 3 | 4 | 5 | 6 |
| Re-detachability |  | X | Δ | X | Δ | ⊙ | ⊙ |
| Endurance Reliability | Heat resistant condition | ○ | ○ | ○ | Δ | X | X |
|  | Humidity and heat resistant condition | ○ | ○ | ○ | Δ | X | X |
| Light transmission uniformity |  | X | Δ | ○ | Δ | X | X |

As could be known from results of the above tables 5 and 6, in cases of Examples 1 to 4 according to the present invention, re-detachability, endurance reliability and light transmission uniformity of the pressure sensitive adhesives were maintained all outstandingly. However, in cases of Comparative Examples 1 and 3 using polymers having a molecular weight of 1,000,000 or more, it was identified to highly reduce re-detachability and light transmission uniformity, although the IPN structures were embodied in the pressure sensitive adhesives. Furthermore, in case of Comparative Example 6 using a polymer having a molecular weight of 500,000 or less, stress relaxation characteristic was secured to a certain degree, but durability was highly lowered.

Also, in cases of Comparative Examples 2 and 4 using polymers having a molecular weight of 1,000,000 or more and embodying no IPN structure in the pressure sensitive adhesives, it could be identified that at least one physical property of re-detachability, durability and control capability of light leakage control capability was lowered and its balance was poor. In addition, in case of Comparative Example 5 embodying no IPN structure in the pressure sensitive adhesive, it was also identified that durability of the pressure sensitive adhesive was highly lowered.

The invention claimed is:

1. A pressure sensitive adhesive composition comprising:
   a crosslinkable acrylic polymer having a weight average molecular weight of more than 500,000 and 700,000 or less;
   a multifunctional crosslinker;
   a non-crosslinkable acrylic polymer having a weight average molecular weight of more than 500,000 and 700,000 or less; and
   a multifunctional acrylate which is included in an amount of more than 5 parts by weight and less than 15 parts by weight, relative to 100 parts by weight of the crosslinkable acrylic polymer,
   wherein an interpenetrating polymer network structure comprising a cross-linked structure by an acrylic polymer cross-linked with a multifunctional crosslinker, and a cross-linked structure by a polymerized multifunctional acrylate, is embodied in a cured state, the multifunctional crosslinker being different from the multifunctional acrylate,
   wherein a ratio of the non-crosslinkable acrylic polymer to the crosslinkable acrylic polymer by weight is 0.01 to 0.4, and
   wherein the gel content of the pressure sensitive adhesive composition as represented by General Formula 2 is 80% to 99% by weight:

Gel content (% by weight)=$B/A$×100,   [General Formula 2]

wherein A represents a mass of said pressure sensitive adhesive and B represents a dry mass of insoluble fractions in said pressure sensitive adhesive after depositing it in ethyl acetate at room temperature for 48 hours.

2. The pressure sensitive adhesive composition according to claim 1, wherein the crosslinkable acrylic polymer comprises 80 to 99.8 parts by weight of a (meth)acrylic acid ester monomer; and 0.01 to 10 parts by weight of a crosslinkable monomer as a polymerized unit.

3. The pressure sensitive adhesive composition according to claim 1, wherein the multifunctional crosslinker is one or more selected from a group consisting of an isocyanate compound, an epoxy compound, an aziridine compound and a metal chelate compound.

4. The pressure sensitive adhesive composition according to claim 1, wherein the multifunctional crosslinker is included in an amount of 0.01 to 10 parts by weight, relative to 100 parts by weight of the crosslinkable acrylic polymer.

5. The pressure sensitive adhesive composition according to claim 1, wherein the multifunctional acrylate comprises a ring structure in the molecular structure thereof.

6. The pressure sensitive adhesive composition according to claim 1, further comprising a photoinitiator.

7. The pressure sensitive adhesive composition according to claim 1, further comprising a silane coupling agent or a tackifier.

8. The pressure sensitive adhesive composition according to claim 1, having a viscosity of 3,000 cP to 12,000 cP at room temperature and a solid content of at least 20% by weight.

* * * * *